US008015401B2

(12) United States Patent　　(10) Patent No.: US 8,015,401 B2
Beuque et al.　　(45) Date of Patent: *Sep. 6, 2011

(54) AUTHENTICATION OF DATA TRANSMITTED IN A DIGITAL TRANSMISSION SYSTEM

(75) Inventors: Jean-Bernard Gerard Maurice Beuque, Bois-Colombes (FR); Philippe Poulain, Paris (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 25 days.

This patent is subject to a terminal disclaimer.

(21) Appl. No.: 12/140,303

(22) Filed: Jun. 17, 2008

(65) Prior Publication Data

US 2008/0263354 A1　　Oct. 23, 2008

Related U.S. Application Data

(63) Continuation of application No. 10/240,638, filed on Apr. 16, 2003, now Pat. No. 7,437,561.

(30) Foreign Application Priority Data

Apr. 3, 2000　(EP) ..................................... 00400912

(51) Int. Cl.
*H04L 9/00* (2006.01)

(52) U.S. Cl. ........ 713/158; 713/176; 713/157; 713/156; 713/153; 380/279; 725/31

(58) Field of Classification Search ........................ None
See application file for complete search history.

(56) References Cited

U.S. PATENT DOCUMENTS

| 6,097,811 | A  | * | 8/2000  | Micali ........................... 713/186 |
| 6,212,633 | B1 | * | 4/2001  | Levy et al. .................... 713/153 |
| 6,487,658 | B1 | * | 11/2002 | Micali ........................... 713/158 |
| 7,210,035 | B2 | * | 4/2007  | Doyle et al. .................. 713/157 |
| 2002/0062438 | A1 | | 5/2002 | Asay et al. |
| 2005/0114653 | A1 | * | 5/2005 | Sudia ........................... 713/158 |

OTHER PUBLICATIONS

U.S. Office Action issued in Feb. 26, 2010, by the U.S.P.T.O., for related U.S. Appl. No. 11/489,338, 9 pages.

* cited by examiner

*Primary Examiner* — Nasser Moazzami
*Assistant Examiner* — Fikremariam Yalew
(74) *Attorney, Agent, or Firm* — Osha • Liang LLP

(57) ABSTRACT

A method of authenticating data transmitted in a digital transmission system, in which the method comprises the steps, prior to transmission, of determining at least two encrypted values for at least some of the data, each encrypted value being determined using a key of a respective encryption algorithm, and outputting said at least two encrypted values with said data.

2 Claims, 11 Drawing Sheets

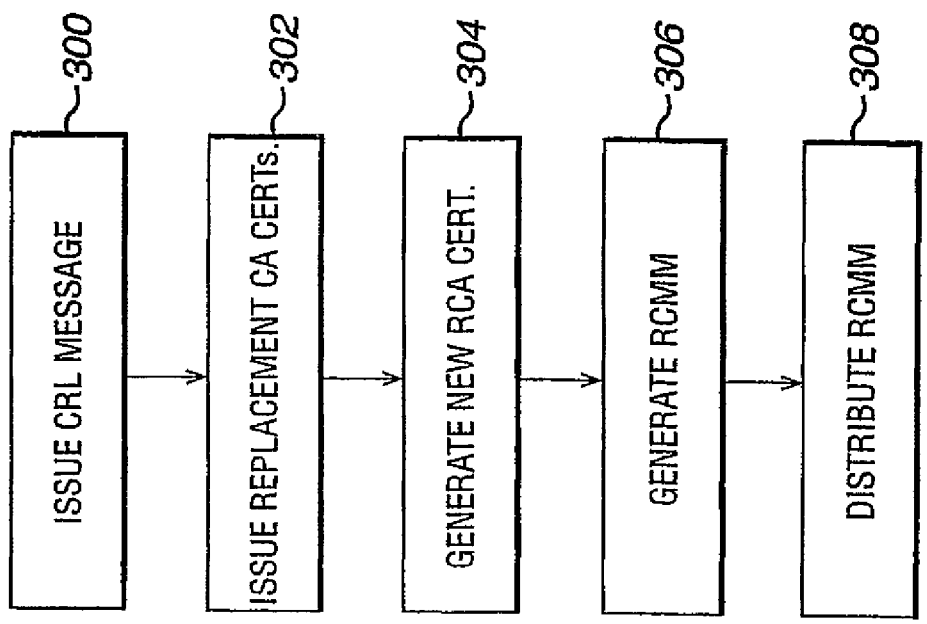
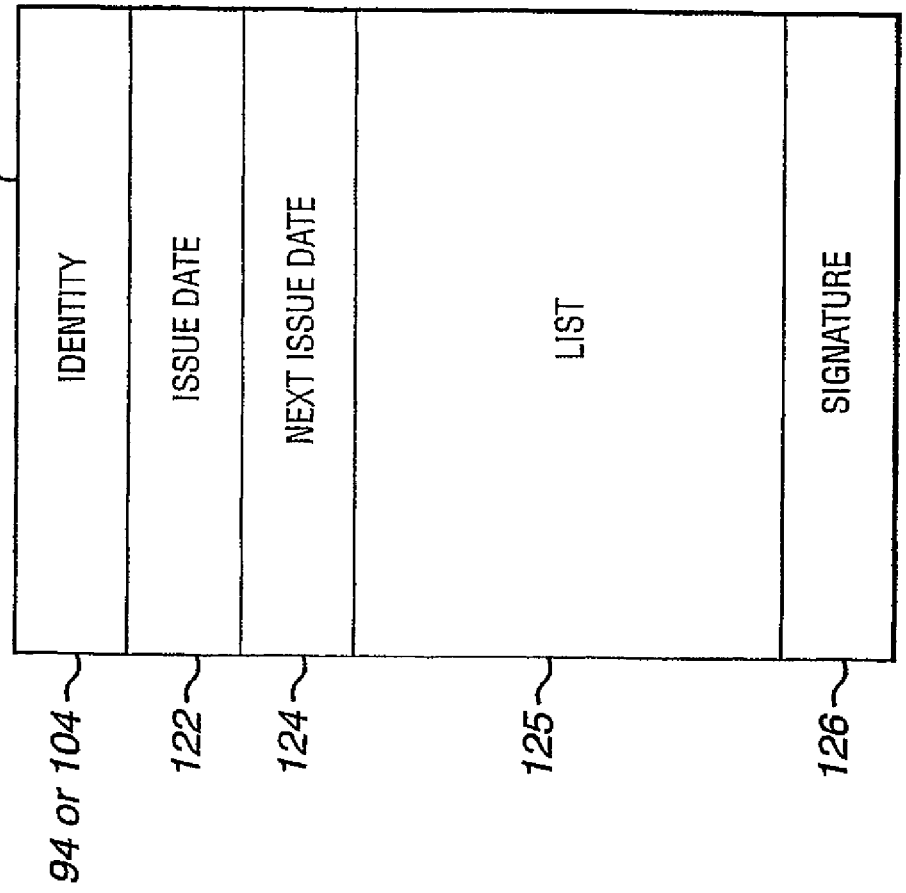

AUTHENTICATION OF DATA TRANSMITTED IN A DIGITAL TRANSMISSION SYSTEM

This application is a continuation application of U.S. patent application Ser. No. 10/240,638, filed Oct. 3, 2002, which claims priority from European patent application No. 00400912.2 filed on Apr. 3, 2000.

The present invention relates to a method of authentication of data transmitted in a digital transmission system.

Broadcast transmission of digital data is well-known in the field of pay TV systems, where scrambled audiovisual information is sent, usually by satellite or satellite/cable link, to a number of subscribers, each possessing a decoder capable of descrambling the transmitted program for subsequent viewing. Terrestrial digital broadcast systems are also known. Recent systems have also used the broadcast link to transmit other data, in addition to or as well as audiovisual data, such as computer programs or interactive applications to the decoder or a to a connected PC.

A particular problem with the transmission of application data lies in the need to verify the integrity and origin of any such data. Since data of this kind may be used to reconfigure the decoder, as well as implementing any number of interactive applications, it is essential that the received data is both complete and identified as originating from a known source. Otherwise, operational problems linked to downloading of incomplete data may arise, as well as the risk that the decoder becomes open to attacks by third parties or the like.

Verifying the integrity of such data may be conducted by the verification of the packet stream of data received directly by the decoder. Prior to transmission, packets are typically signed by applying a hashing algorithm, to at least some of the data in the packet. The resulting hash value is stored in the packet. Upon reception of the data packet, the decoder applies the same hashing algorithm to the data, and compares the hash value calculated by the decoder with the hash value stored in the received packet so as to verify the integrity of the received data. For example, in the event of a fault or break in the transmission, the calculated hash value will not be the same as the received hash value. The decoder will then be alerted to the presence of possible errors in the downloaded data packet and will reload the faulty data packet.

A problem associated with the use of a well-known hashing algorithm, such as the Message Digest algorithm MD5, is that the calculation of the hash value is carried out according to a publicly known series of calculation steps, with the result that anyone can calculate the hash value of a data packet. Therefore, it will not be possible to verify the origin of a data packet received by the decoder. This can be of particular importance when the received data modifies the operational data files of the decoder.

To overcome this problem, instead of using a hashing algorithm to calculate a hash value for at least some of the data, a signature value of a data packet may be calculated using a secret key value known only to the broadcaster. This key may be obtained using a symmetric key algorithm, such as the Data Encryption Standard, or DES, algorithm, with the decoder storing an equivalent key. However, more convenience can be provided by using an asymmetric public/private key algorithm such as the Rivest, Shamir and Adleman, or RSA, algorithm, in which the public and private keys form complementary parts of a mathematical equation.

The broadcaster responsible for producing the data packets stores the private key, and calculates the signature value using the private key. The public key is stored in the decoders which are to receive the data by hard coding the public key into the memory of the decoder during manufacture. Upon reception of the data packet, the decoder verifies the signature value using the stored public key by comparing the received data with the result of applying the public key algorithm to the received signature value.

Even in such secure systems, it is possible for the value of the private key to be compromised, for example, by being unlawfully publicly distributed. In such cases, it becomes necessary for the broadcaster quickly to revoke the use of the equivalent public key so as to prevent unauthorised reception of data packets. In addition, it will also become necessary for a new public/private key pair to be used. Therefore, the broadcaster will need to replace the public key, stored in the decoders of lawful users, with a new public key. Depending on the sensitivity of the public key, this may require the broadcaster to organise the costly and troublesome return of these decoders to the manufacturer for hard coding of the new public key into the memories of these decoders.

At least in its preferred embodiments, the present invention seeks to solve these and other problems.

A first aspect of the present invention provides a method of authenticating data transmitted in a digital transmission system, said method comprising the steps, prior to transmission, of:

determining at least two encrypted values for at least some of the data, each encrypted value being determined for the same data using a key of a respective encryption algorithm; and outputting said at least two encrypted values with said data.

The present invention is particularly applicable to, but not restricted to, situations where it is desirable to update securely sensitive data, such as a key to be used in a new encryption algorithm, to ensure that the data is received "as issued". To provide such security, at least two encrypted values for at least some, preferably the majority, more preferably all, of the data are determined. Each encrypted value is determined using a key of a respective encryption algorithm. If one of the keys has become compromised, it may be possible for a "hacker" to intercept the data and change the contents of the data and the encrypted value calculated using the compromised key. However, it will not be possible for the hacker to change the encrypted value calculated using the uncompromised key. Therefore, upon verification of the encrypted values, using equivalent keys to the keys used to calculate the encrypted values, the two values using the equivalent keys will not be the same, indicating that the data has become corrupted.

The data and encrypted values are preferably output for transmission to a receiver/decoder. Preferably, said data and said encrypted values are received by a receiver/decoder, wherein each encrypted value is processed using a key of said respective encryption algorithm, and each subsequently resulting value is compared with said at least some of the data to authenticate said at least some of the data. If this data has become corrupted, the receiver/decoder can choose to ignore the data, and so a compromised or corrupted new key will not be stored in the memory of the decoder. Preferably, said received data is rejected by the receiver/decoder if at least one of the subsequently resulting values is different from said at least some of the data.

Therefore, the present invention extends to a method of authenticating data transmitted in a digital transmission system, said method comprising the steps of:

receiving said data and at least two encrypted values determined for at least some of the data, each encrypted value being determined using a key of a respective encryption algorithm;

storing a plurality of keys;

processing each encrypted value using a stored key of said respective encryption algorithm; and comparing each subsequently resulting value with said at least some of the data to authenticate said at least some of the data.

Preferably, each algorithm is asymmetric. In a preferred embodiment, each encrypted value corresponds to a digital signature calculated using a private key of a respective encryption algorithm, each signature being processable using a public key of said encryption algorithm.

Preferably, the method comprises the step of outputting, with each signature, an identifier of the public key to be used to process that signature. This can enable the receiver/decoder to identify readily the key to be used to verify that signature.

Preferably, the data comprises a key. In a preferred embodiment, the data comprises at least one digital certificate, preferably at least one digital root certificate, containing a public key of an encryption algorithm for processing data. The at least one digital certificate may comprise a digital signature calculated using a private key of the encryption algorithm of the public key contained in that certificate. Thus, a digital certificate can be securely transmitted to a decoder without the decoder having to be returned to the manufacturer for the hard coding of a new certificate in the memory of the decoder.

Preferably, said data comprises an identifier of a revoked public key. The identifier may comprise an identifier of a digital certificate, preferably a digital root certificate, containing said revoked public key. The data may comprise a plurality of said identifiers, each identifier identifying a respective revoked public key. Thus, a list of identifiers of revoked keys may be securely transmitted to a decoder.

By means of the above method, data can be updated securely, provided that the number of compromised keys is lower than the number of encrypted values stored with the data. Therefore, said data and said at least two encrypted values may be organised in a data file, which may comprise an indication of the minimum number of encrypted values to be stored in the subsequently generated data file. This enables the minimum number of encrypted values to be altered, for example, incremented, if a key should become compromised so that the minimum number of encrypted values remains greater than the number of compromised keys.

Preferably, the data file is received by a receiver/decoder, which compares the number of encrypted values stored in said data file with said minimum number, and rejects said data file if the number of encrypted values stored in said data file is less than said minimum number.

The data file may be transmitted in a data module. A module encrypted value for at least some of the data in said module may be calculated using a key of a transmitter encryption algorithm and stored in said data module. The data module may be received by a receiver/decoder, which processes said module encrypted value using a key of a transmitter encryption algorithm, and compares the subsequently resulting value with said at least some of the data in said module to authenticate said at least some of the data in said module.

The encrypted value for at least some of the data in said module may correspond to a digital signature calculated using a private key of a transmitter encryption algorithm and processable using a public key of said transmitter encryption algorithm.

The digital transmission system may be a digital broadcast system, such as a television or audio system.

The present invention also provides apparatus for authenticating data to be transmitted in a digital transmission system, said apparatus comprising:
  means for determining at least two encrypted values for at least some of the data, each encrypted value being determined for the same data using a key of a respective encryption algorithm; and
  means for outputting said at least two encrypted values with said data.

The present invention also provides a system for authenticating data transmitted in a digital transmission system, said system comprising apparatus as aforementioned. The system preferably further comprises a receiver/decoder comprising means for receiving said data and said encrypted values, means for processing each encrypted value using a key of said respective encryption algorithm, and means for comparing each subsequently resulting value with said at least some of the data to authenticate said at least some of the data.

The present invention extends to a receiver/decoder comprising:
  means for receiving a data file comprising data and at least two encrypted values determined for at least some of the data, each encrypted value being determined using a key of a respective encryption algorithm;
  means for storing a plurality of keys;
  means for processing each encrypted value using a stored key of said respective encryption algorithm; and
  means for comparing each subsequently resulting value with said at least some of the data to authenticate said at least some of the data.

The present invention also extends to a system for authenticating data transmitted in a digital transmission system, said system comprising apparatus as aforementioned and a receiver/decoder as aforementioned.

The present invention further extends to a signal comprising data and at least two encrypted values determined for at least some of the data, each encrypted value being determined using a key of a respective encryption algorithm.

The present invention further extends to a method of, or apparatus for, authenticating data, a receiver/decoder, or a signal substantially as herein described with reference to the accompanying drawings.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser or integrated with other devices such as a video recorder or a television.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on.

As used herein, the term "digital television system" includes for example any satellite, terrestrial, cable and other system.

Suitable algorithms for use in this invention for generating private/public keys may include RSA, Fiat-Shamir, or Diffie-Hellman, and suitable symmetric key algorithms may include DES type algorithms, for example. However, unless obligatory in view of the context or unless otherwise specified, no general distinction is made between keys associated with symmetric algorithms and those associated with public/private algorithms.

The terms "scrambled" and "encrypted", and "control word" and "key" have been used at various parts in the text for the purpose of clarity of language. However, it will be understood that no fundamental distinction is to be made between "scrambled data" and "encrypted data" or between a "control word" and a "key".

Additionally, the terms "encrypted" and "signed", and "decrypted" and "verified" have been used at various parts in the text for the purpose of clarity of language. However, it will be understood that no fundamental distinction is to be made between "encrypted data" and "signed data", and "decrypted data" and "verified data".

Similarly, the term "equivalent key" is used to refer to a key adapted to decrypt data encrypted by a first mentioned key, or vice versa.

Features described above relating to method aspects of the present invention can also be applied to apparatus aspects, and vice versa.

There will now be described, by way of example only, a preferred embodiment of the invention with reference to the attached figures, in which:

FIG. 9 shows the format of a Certificate Revocation List;

FIG. 12 shows one embodiment of the present invention with reference to replacing CA certificates.

Figure 1:
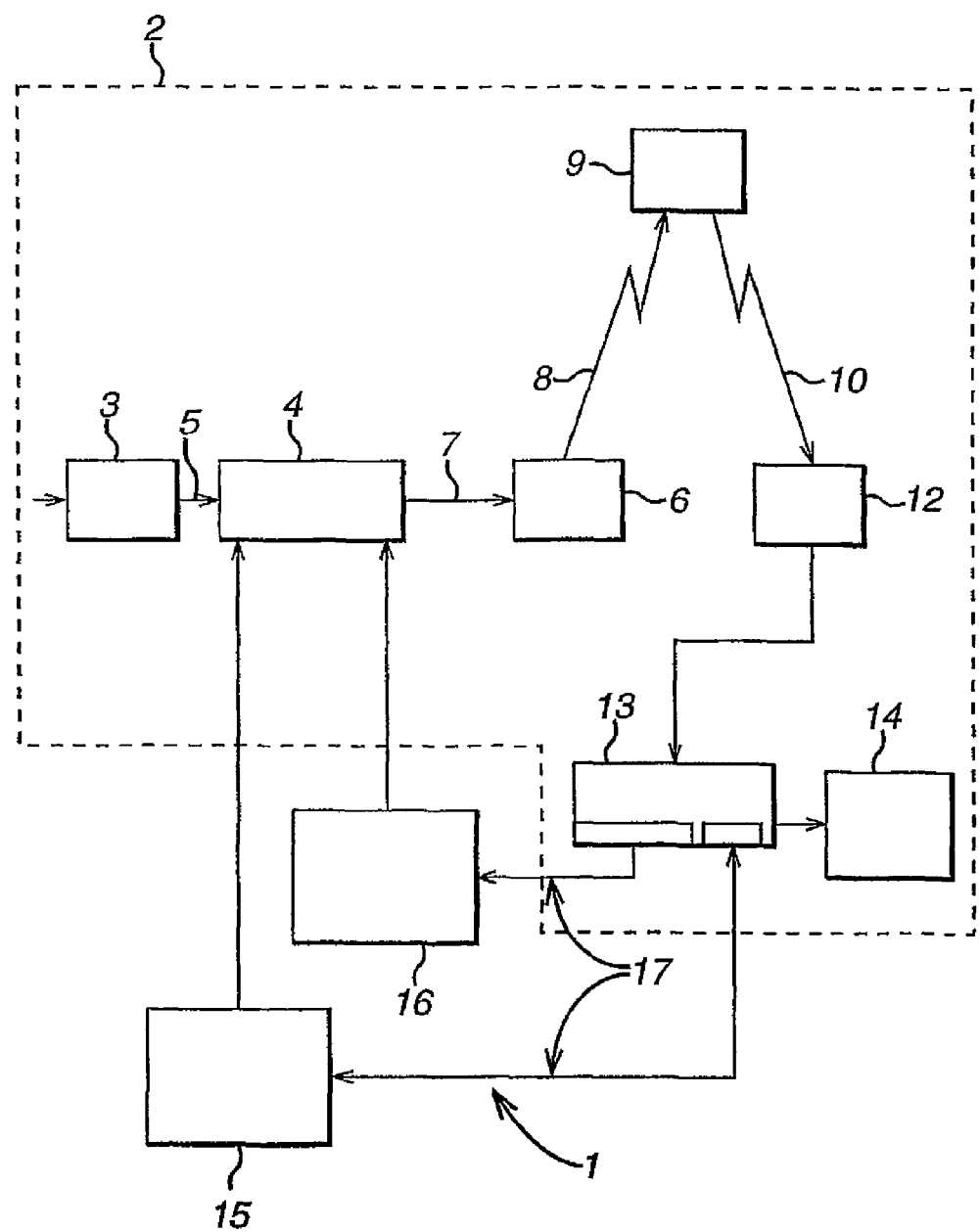
FIG. 1 shows the schematic outline of a digital television system for use with the present invention.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a sitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information. In such a case, a stream of digital data in the form, for example, of DSM-CC (Digital Storage Media Command and Control) format software files and messages, will be compressed and packetised into the MPEG format by the compressor 3. The downloading of software modules will be described in greater detail below.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode. In practice, the decoder may be configured to handle multiple access control systems, for example of the Simulcrypt or Multicrypt design.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent of the exploitation key stored on a smartcard inserted in the decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission. In addition to their use in decrypting audiovisual television programs, similar exploitation keys may be generated and transmitted for use in the verification of other data such as software modules as will be described below.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Physical Elements of the Receiver/Decoder

Figure 2:
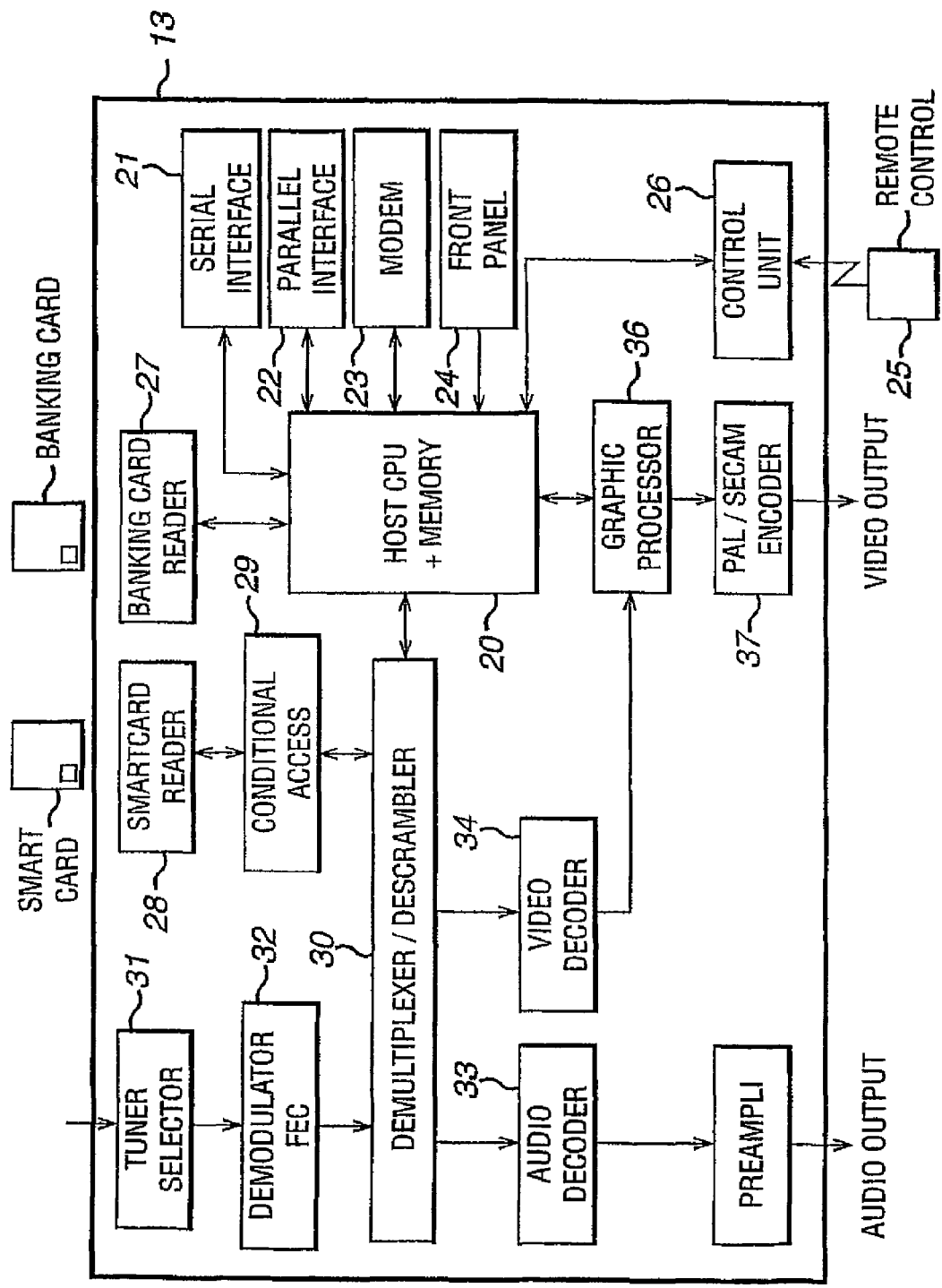
FIG. 2 shows the structure of a decoder of the system of FIG. 1.

Referring to FIG. 2, the physical elements of the receiver/decoder 13 or set-top box adapted to be used in the present invention will now be briefly described. The elements shown in this figure will be described in terms of functional blocks.

The decoder 13 comprises a central processor 20 including associated memory elements and adapted to receive input data from a serial interface 21, a parallel interface 22, and a modem 23 (connected to the modem back channel 17 of FIG. 1).

The decoder is additionally adapted to receive inputs from an infra-red remote control 25 via a control unit 26 and from switch contacts 24 on the front panel of the decoder. The decoder also possesses two smartcard readers 27, 28 adapted to read bank and subscription smartcards 29, 30 respectively. Input may also be received via an infra-red keyboard (not shown). The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. The software architecture of the central processor corresponds to a virtual machine interacting with a lower level operating system implemented in the hardware components of the decoder.

Packet Structure of Transmitted Data

There will now be described, with reference to FIGS. 3 and 4, the packet structure of data within the broadcast MPEG transport stream sent from the transmitter to the decoder. As will be appreciated, whilst the description will focus on the tabulation format used in the MPEG standard, the same principles apply equally to other packetised data stream formats.

Figure 3:
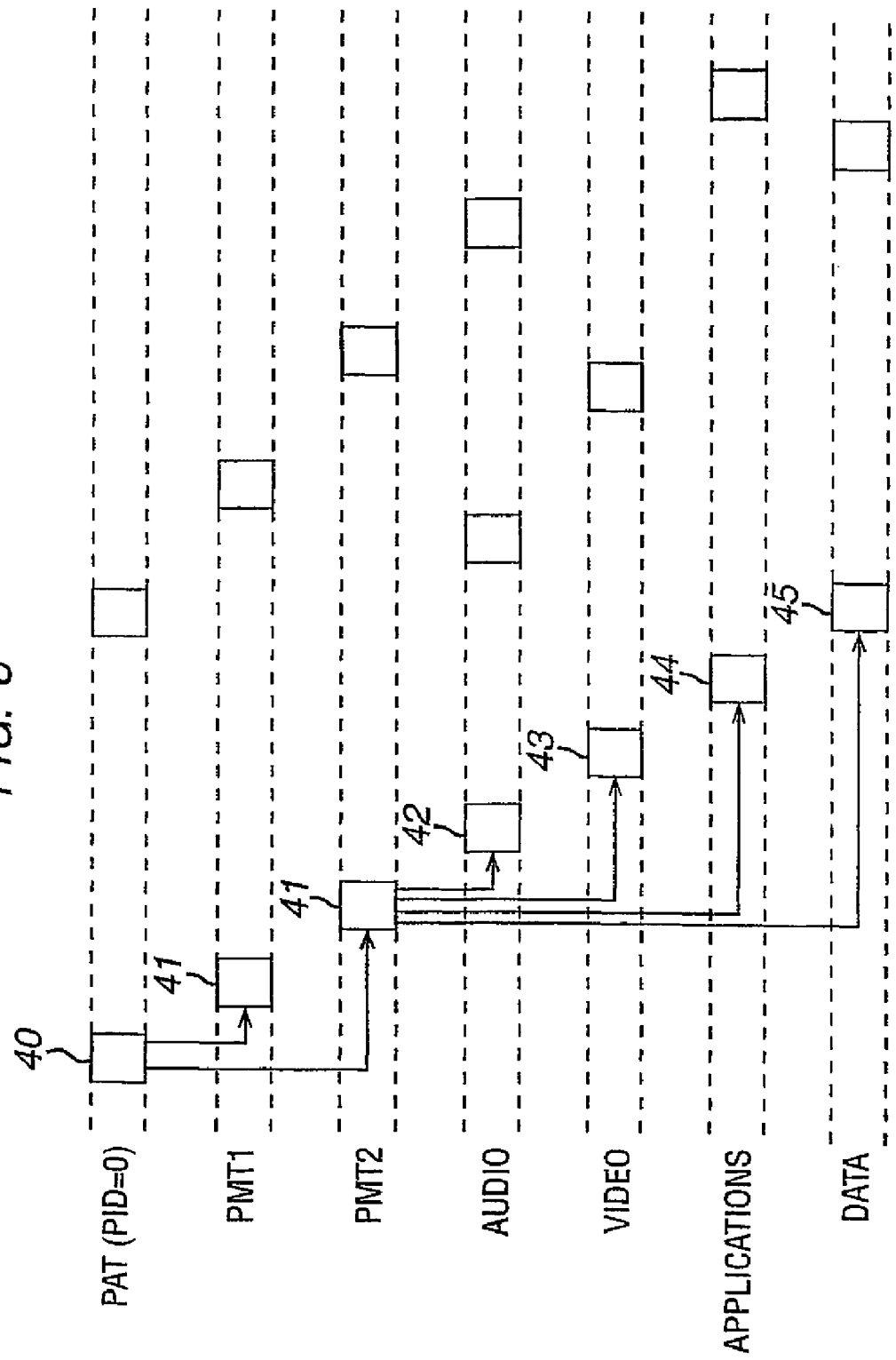
FIG. 3 shows the structure of a number of components within the MPEG broadcast transport stream.

Referring in particular to FIG. 3, an MPEG bitstream includes a programme access table ("PAT") 40 having a packet identification ("PID") of 0. The PAT contains references to the PIDs of the programme map tables ("PMTs") 41 of a number of programmes. Each PMT contains a reference to the PIDs of the steams of the audio MPEG tables 42 and video MPEG tables 43 for that programme. A packet having a PID of zero, that is, the programme access table 40, provides the entry point for all MPEG access.

In order to download applications and data therefor, two new stream types are defined, and the relevant PMT also contains references to the PIDs of the streams of application MPEG tables 44 (or sections of them) and data MPEG tables 45 (or sections of them). In point of fact, whilst it may be convenient in some cases to define separate stream types for executable application software and data for processing by such software, this is not essential. In other realisations, data and executable code may be assembled in a single stream accessed via the PMT as described.

Figure 4:
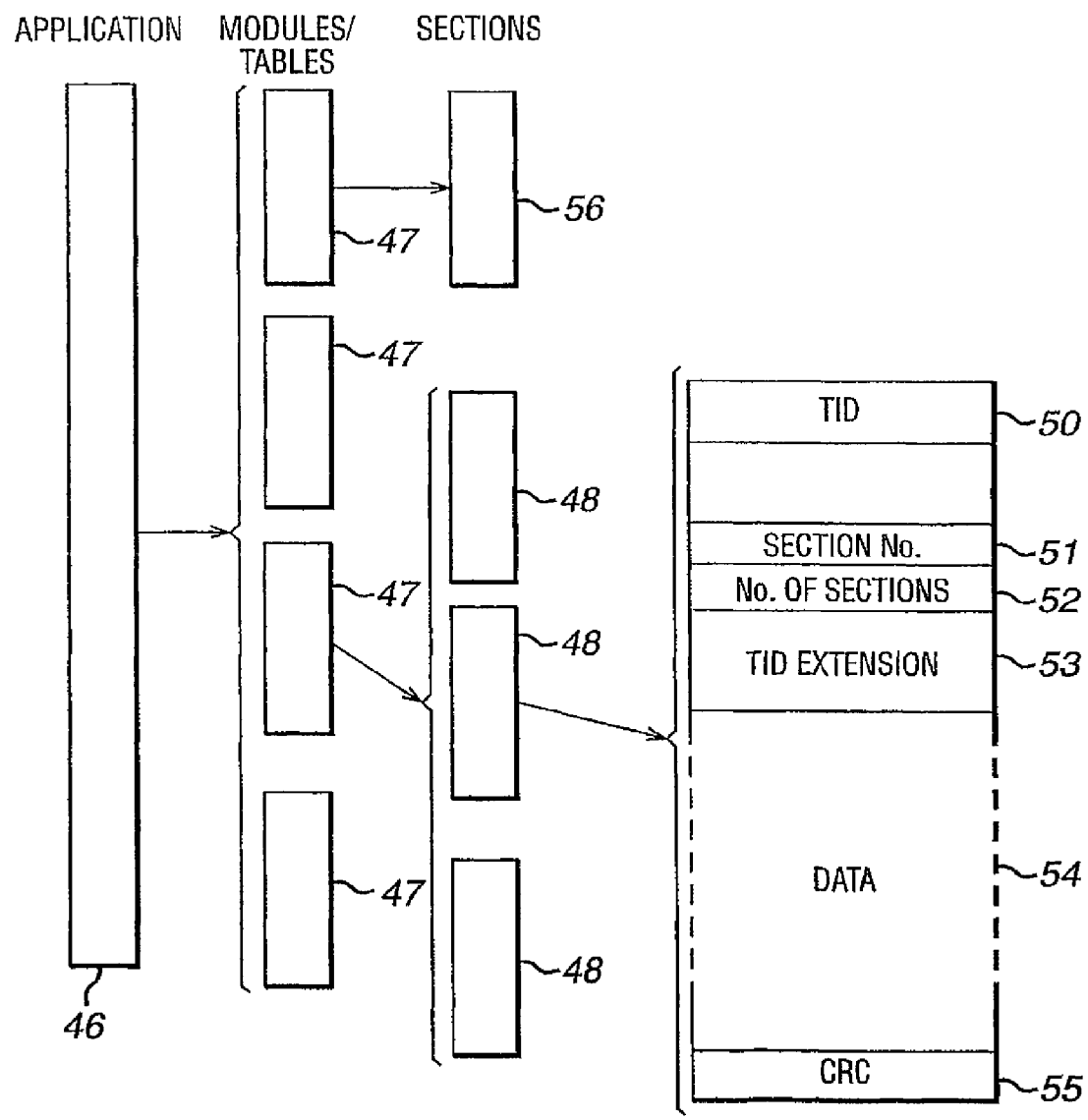
FIG. 4 shows the division of a software application into a number of MPEG tables.

Referring to FIG. 4, in order to download, for example, an application within a stream 44, the application 46 is divided into modules 47, each formed by an MPEG table. Some of these tables comprise a single section whilst others may be made up by a plurality of sections 48. A typical section 48 has a header, which includes a one-byte table identification ("TID") 50, the section number 51 of that section in the table, the total number 52 of sections in that table and a two-byte TID extension reference 53. Each section also includes a data part 54 and a CRC 55. For a particular table 47, all of the sections 48 making up that table 47 have the same TID 50 and the same TID extension 53. For a particular application 46, all of the tables 47 making up that application 46 have the same TID 50, but different respective TID extensions.

For each application 46, a single MPEG table is used as a directory table 56. The directory table 56 has, in its header, the same TID as the other tables 47 making up the application. However, the directory table has a predetermined TID extension of zero for identification purposes and due to the fact only a single table is needed for the information in the directory. All of the other tables 47 will normally have non-zero TID extensions and are composed of a number of associated sections 48. The header of the directory table also includes a version number of the application to be downloaded.

Referring back to FIG. 3, the PAT 40, PMTs 41 and application and data stream components 44, 45 are cyclically transmitted. Each application which is transmitted has a respective predetermined TID. To download an application, the MPEG table having the appropriate TID and a TID extension of zero is downloaded to the receiver/decoder. This is the directory table for the required application. The data in the directory is then processed by the decoder to determine the TID extensions of the tables making up the required application. Thereafter any required table having the same TID as the directory table and a TID extension determined from the directory can be downloaded.

The decoder is arranged to check the directory table for any updating thereof. This may be done by downloading the directory table again periodically, for example every 30 seconds, or one or five minutes, and comparing the version number of the previously downloaded directory table. If the freshly downloaded version number is that of a later version, then the tables associated with the previous directory table are deleted, and the tables associated with the new version downloaded and assembled.

In an alternative arrangement, the incoming bitstream is filtered using a mask corresponding to the TID, TID extension and version number, with values set for the TID of the application, a TID extension of zero and a version number one greater than the version number of the currently downloaded directory. Accordingly, an increment of the version number can be detected, and once detected the directory is downloaded and the application is updated, as described above. If an application is to be terminated, an empty directory with the next version number is transmitted, but without any modules listed in the directory. In response to receipt of such an empty directory, the decoder 2020 is programmed to delete the application.

In practice, software and computer programs to implement applications in the decoder may be introduced via any of the parts of the decoder, in particular in the datastream received via the satellite link as described, but also via the serial port, the smartcard link etc. Such software may comprise high level applications used to implement interactive applications within the decoder, such as net browsers, quiz applications, program guides etc. Software may be also be downloaded to change the working configuration of the decoder software, for example by means of "patches" or the like.

Applications may also be downloaded via the decoder and sent to a PC or the like connected to the decoder. In such a case, the decoder acts as a communication router for the software, which is eventually run on the connected device. In addition to this routing function, the decoder may also function to convert the MPEG packetised data before routing to the PC into computer file software organised, for example, according to the DSM-CC protocol (see below).

Organisation of Data in Data Files

Figure 5:
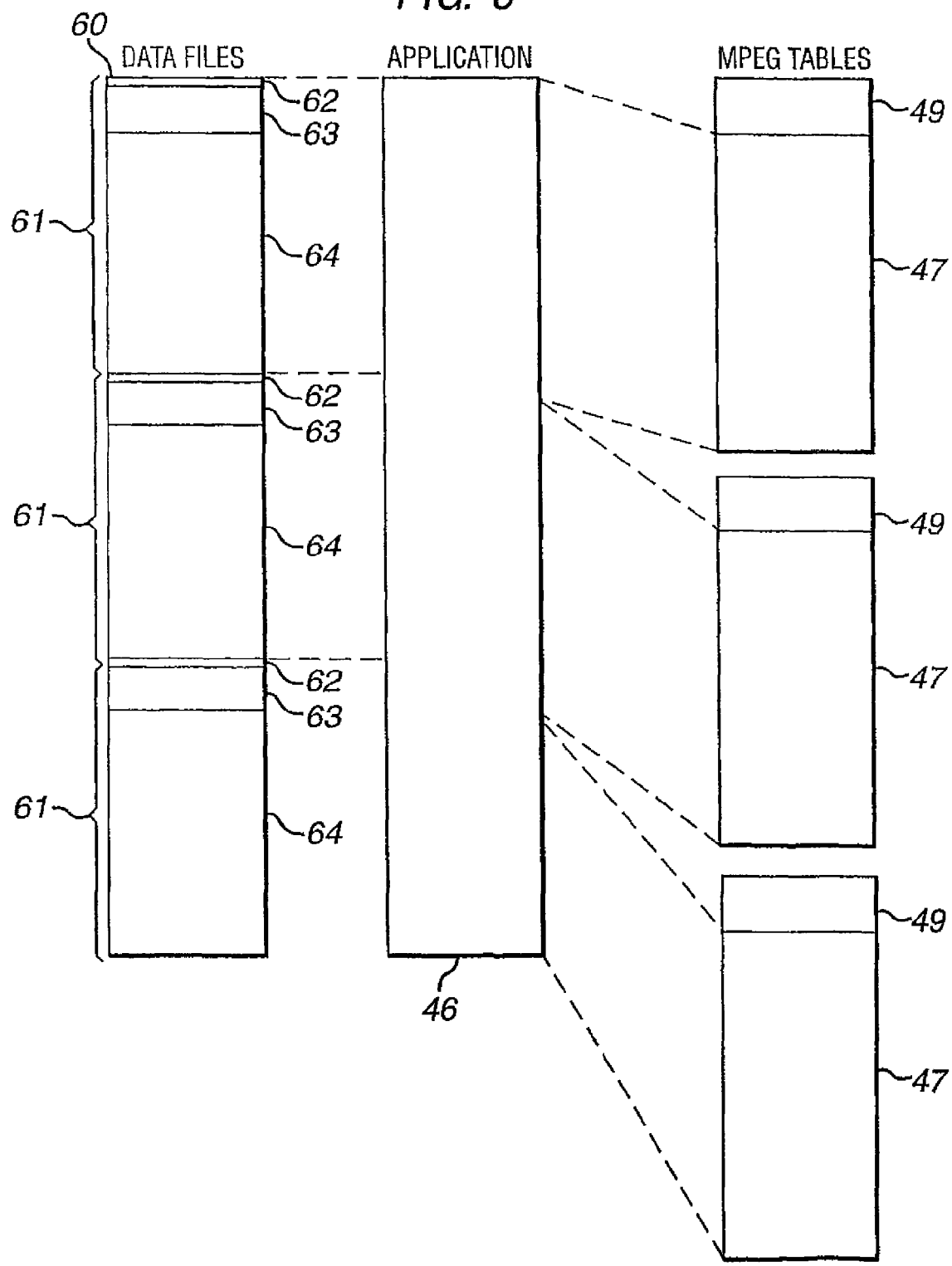
FIG. 5 shows the relationship between DSM-CC data files and the eventually produced MPEG tables.

FIG. 5 shows the relationship between data organised in a set of DSM-CC U-U (user to user) data files 60, in an assembled application 46 and as encapsulated within a series of MPEG tables 47. Such a relationship is described in WO99/49614, the contents of which are incorporated herein by reference.

Prior to transmission, the data files are assembled into the application 46 and, thereafter, packetised by an MPEG compressor into MPEG tables or modules 47, as described above, including a header 49 specific to the MPEG packet stream and including table ID, version number etc. As will be appreciated, there may be no fixed relation between the data organised in the data files 61 and the eventual MPEG tables 47. After reception and filtering by the decoder, the packet headers 49 are discarded and the application 46 reconstituted from the payload of the tables 47.

Figure 6:
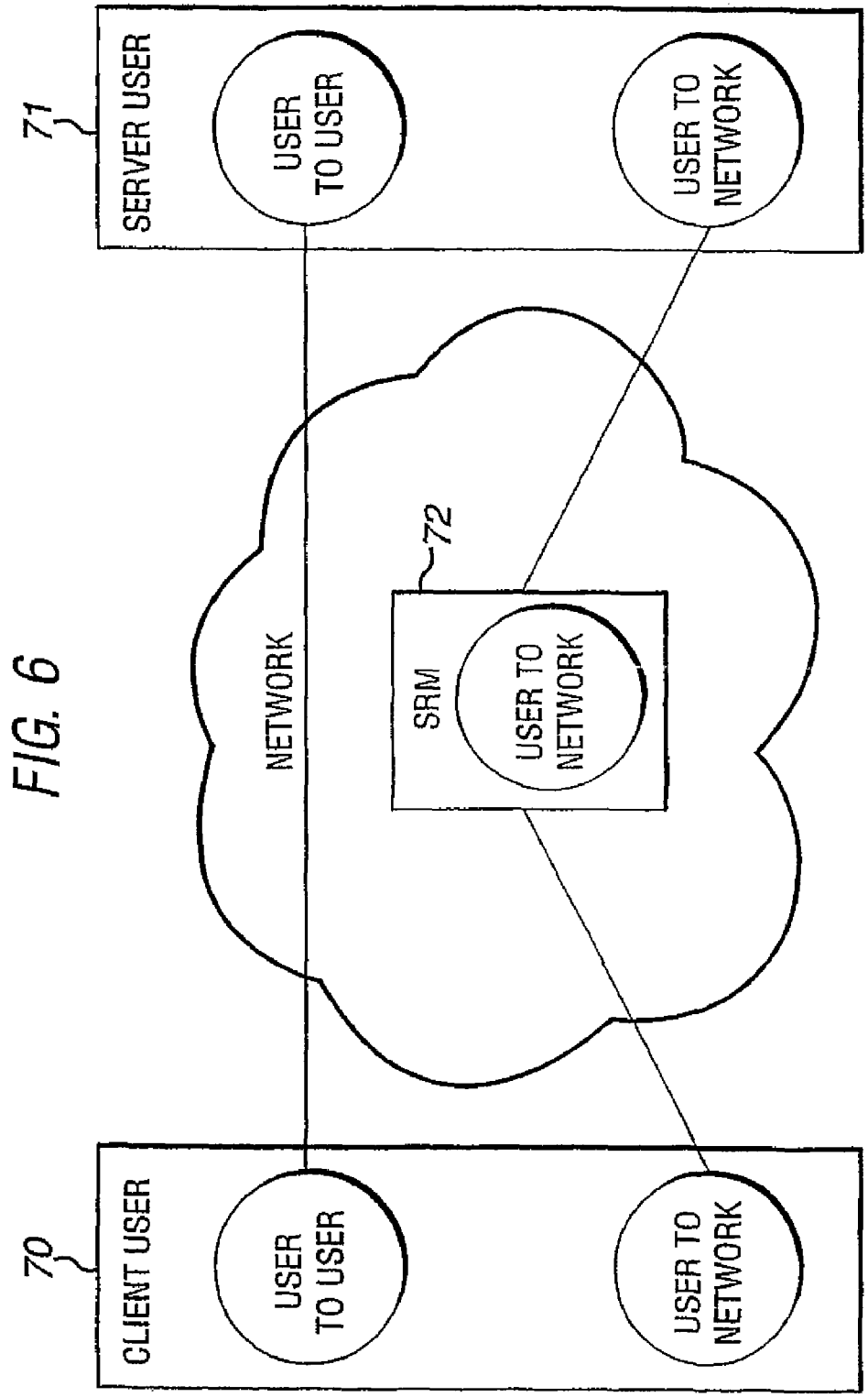
FIG. 6 shows the client, server, network manager relationship as defined in the context of DSM-CC.

The DSM-CC format for data files is a standard adapted in particular for use in multimedia networks and which defines a series of message formats and session commands for communication between a client user 70, a server user 71 and network resource manager 72, as shown in FIG. 6. The network resource manager 72 may be considered as logical entity acting to manage the attribution of resources within a network.

Communication between a client and a server is set up by a series of sessions, a first series of messages being exchanged between a user (client 70 or server 71) and the network manager 72 in order to configure the client and/or server for communication. Such messages are formatted according to the so-called DSM-CC U-N (user to network) protocol. A subset of this protocol has been defined in particular for broadcast downloading of data.

Once a communication link has been established, messages are subsequently exchanged between client 70 and server 71 according to the DSM-CC U-U protocol. A sequence of messages of this kind correspond to the data files 60 of FIG. 5. In the case of DSM-CC U-U messages, data is organised in a series of messages 61 grouped according to the BIOP or Broadcast InterOrb Protocol.

Each message or object 61 comprises a header 62, a subheader 63 and a payload 64 containing the data itself. In accordance with the BIOP protocol, the header 62 contains, inter alia, an indication of the type of message and the BIOP version whilst the sub-header indicates the type of object and other information to be defined by the system architect.

Data objects 64 within the payload of DSM-CC U-U files may generally be defined as one of three types; directory objects, file objects and stream objects. Directory objects define root directories or subdirectories used to reference a series of associated file objects containing the actual application data.

Stream objects may be used to enable a temporal relationship to be established between data contained in the data files and the MPEG packet stream itself. This may be used, for example, in the case of interactive applications contained in the data files and designed to be synchronised with the elementary video or audio streams received and processed by the decoder. As mentioned above, there may otherwise be no direct correlation between the MPEG packetised data and the data files.

Unlike the MPEG tables, where a single directory references a set of tables with only a single level of hierarchy, the data files 60 may be organised in a rather more complex hierarchical manner. As with files stored in a PC or server, a main or root directory may refer to one or more subdirectories which refer in turn to a second level of data files. Reference may even be made to a second root directory associated with another set of application data.

File Structure for a Set of Data Files

Figure 7:
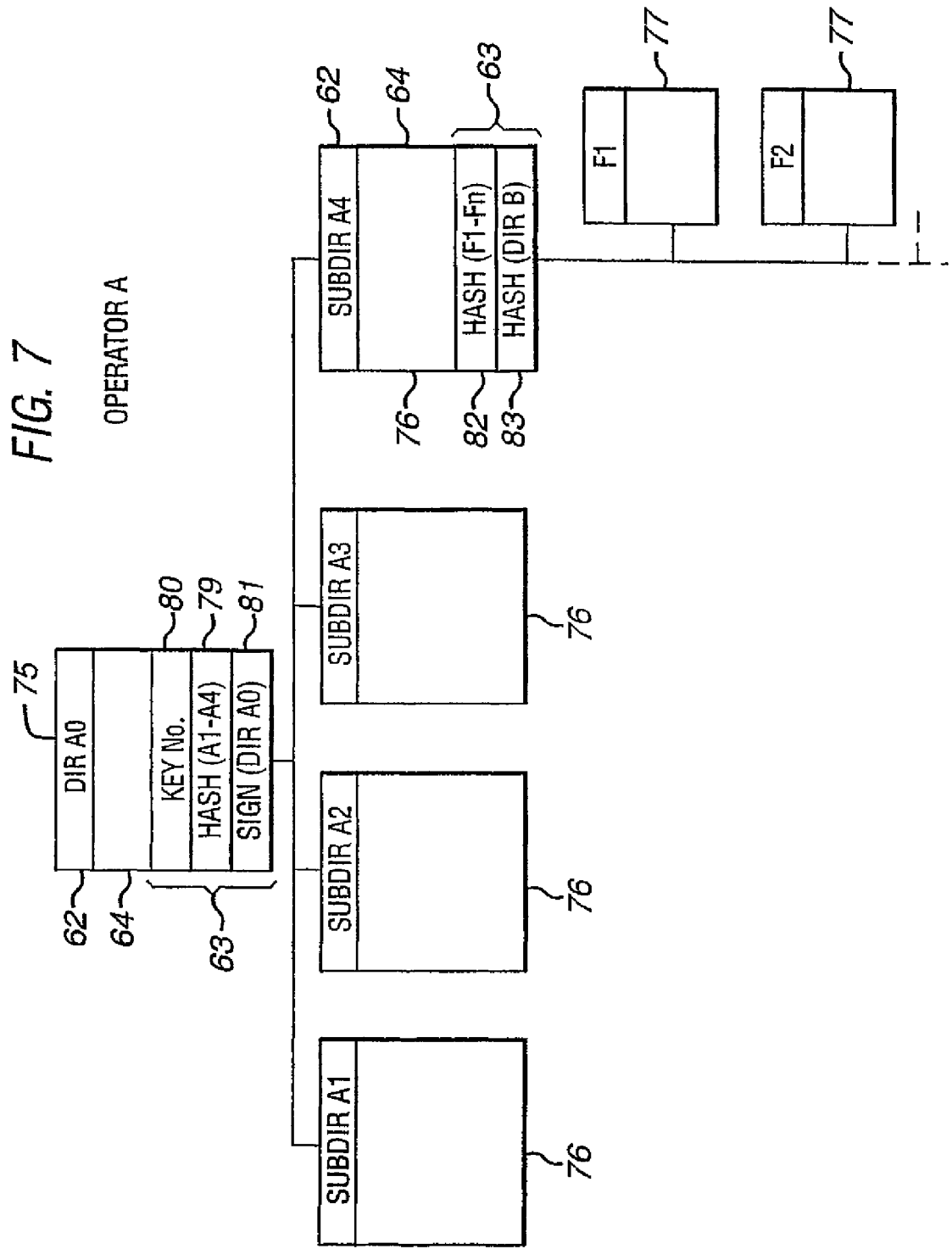
FIG. 7 shows the authenticated directory, subdirectory and file objects.

Referring to FIG. 7, an example of file structure for a set of data files is shown. A root directory DIR A0 indicated at 75 references a group of subdirectories A1 to object files 77. For the sake of clarity only a single group of object files F1, F2 etc. associated with the subdirectory A4 is shown. In practice a number of groups of object files may be referenced by each of the subdirectories A1 to A4.

Within each directory and subdirectory a set of authentication steps is introduced for the files liked to that directory. Referring to the root directory 75, the subheader 63 comprises a hash value obtained by applying a hash algorithm to some or all of the data stored in the subdirectory files A1 to A4 indicated 76. The hashing algorithm used may be of any known type such as, for example, the Message Digest algorithm MD5.

In one realisation, the algorithm may be applied to each associated file or subdirectory individually and a list of the hash values for each subdirectory 76 stored in the root directory 75 prior to transmission. However, whilst such a solution enables an increased degree of checking resolution in terms of verifying each subdirectory, this solution may be rather inefficient in terms of the processing time necessary for the decoder to calculate the corresponding signatures. Accordingly, the subheader 63 of the directory 79 preferably comprises a cumulative hash value 79, calculated by applying the MD5 hashing algorithm to the combined subheader and payload sections 63, 64 of the subdirectories 76, that is, without the header 62. In particular, the hash values 82 contained within the subdirectories 76 and referring to the layer of file objects 77 are included in this hashing calculation.

In the case of the subdirectory A4 shown in FIG. 7, is subdirectory itself refers to a set of object files F1-Fn indicated at 77. In this case, a cumulative hash value 82 is generated for the combined contents of the object files 77. This value is included in the hashing process giving rise to the hash value 79. It is therefore not possible to change any of the object files 77 without changing the hash value 82 of the subdirectory 76, which in turn will change the hash value 79 of the directory 75.

In the present case, a combined hash value is calculated for all of the subdirectories A1-A4 referenced in the directory. This hash value is stored together with an identifier of the group of subdirectories from which the data has been taken. In other embodiments, a series of combined or individual hash values and corresponding identifiers may be stored in the subheader of the directory.

For example, a second set of subdirectories, also associated with the root directory but relating to a different set of data or executable code may also be grouped together and a cumulative hash value calculated for these subdirectories calculated and stored in the subheader root directory. A single hash value associated with a single directory may equally be stored in the subheader of the root directory.

The authorization of groups or individual data files does not of course prevent the root directory (or, indeed, any other file) from also referring to non-validated or unhashed data files, but the absence of validation of such a file will need to be taken into account in any operations with this file. In this regard, it may not be necessary, for example, to authenticate stream objects.

The use of a hashing function in this case primarily enables the decoder to verify the integrity or completeness of the downloaded data files. In the case, for example, of a fault or break in the transmission, the operation of a cumulative hashing algorithm on the received dependent files will not give the same result as the hash value for these files stored in the root directory. The decoder will then be alerted to the presence of possible errors in the downloaded data and will reload the faulty data files.

Signature Value for Root Directory

For enhanced security, a signature value for the root directory 75 is calculated. In this embodiment, a private/public key algorithm such as the Rivest, Shamir and Adleman or RSA algorithm is used, the broadcaster responsible for producing the data files possessing the private key value, the public key values being held by the decoders. Alternatively, the secret key may correspond to a key obtained by a symmetric key algorithm, such as the Data Encryption Standard or DES algorithm.

As shown in FIG. 7, the root directory 75 comprises an broadcaster identifier 80 that will identify to the decoder the public key to be used in the verification stage together with the calculated signature value 81 generated using the private key of the broadcaster. In this case, the signature value 81 is generated by applying the private key held by the broadcaster to some or all of the data within the directory 75, preferably including the payload data 64 and/or the cumulative hash value or values 79. The decoder can then verify this signature value 81 using the corresponding public key identified by the broadcaster identifier 80.

In this example, the data in the directory 75 is unencrypted and the private key is simply used to provide a signature value verifiable by the public key. In alternative embodiments, some or all of the contents of the directory may be encrypted by the private key and thereafter decrypted by a corresponding key.

In either case, the generation of a signature value or block of encrypted code by use of a secret key enables a decoder to verify the integrity and origin of the directory 75 and, by implication, the integrity and origin of the files referred to by this root directory. Since the cumulative hash values for the referred files are included in the calculation of the signature 81 it is not possible to alter these values without this being detected at the verification stage. Since each hash value is generally unique to a given set of data, it would therefore not be possible to change the content of any of dependent hashed files without changing their characteristic hash value and, thereby, the resulting signature value of a directory.

As will be appreciated, a number of variations may be possible, notably to reduce the amount of data hashed or signed at each stage. In particular, in the case of a signature or hash value in a directory or subdirectory used to verify a lower level data file, the directory signature or hash value may be generated using only the lower level hash value and no other data.

For example, the combined hash value 79 in the A0 directory 75 may be generated using the combined hash values 82, 83 of each of the A1-A4 subdirectories indicated at 76. Since these values are just as unique as the data in the payloads of the subdirectory, the combined hash value 79 will still be unique to the subdirectories in question. Furthermore, the integrity of the lower level of object and directory files 77, 78 may still be assumed since the hash values 82 are still used in the calculation.

Broadcaster Digital Certificates

Figure 8:
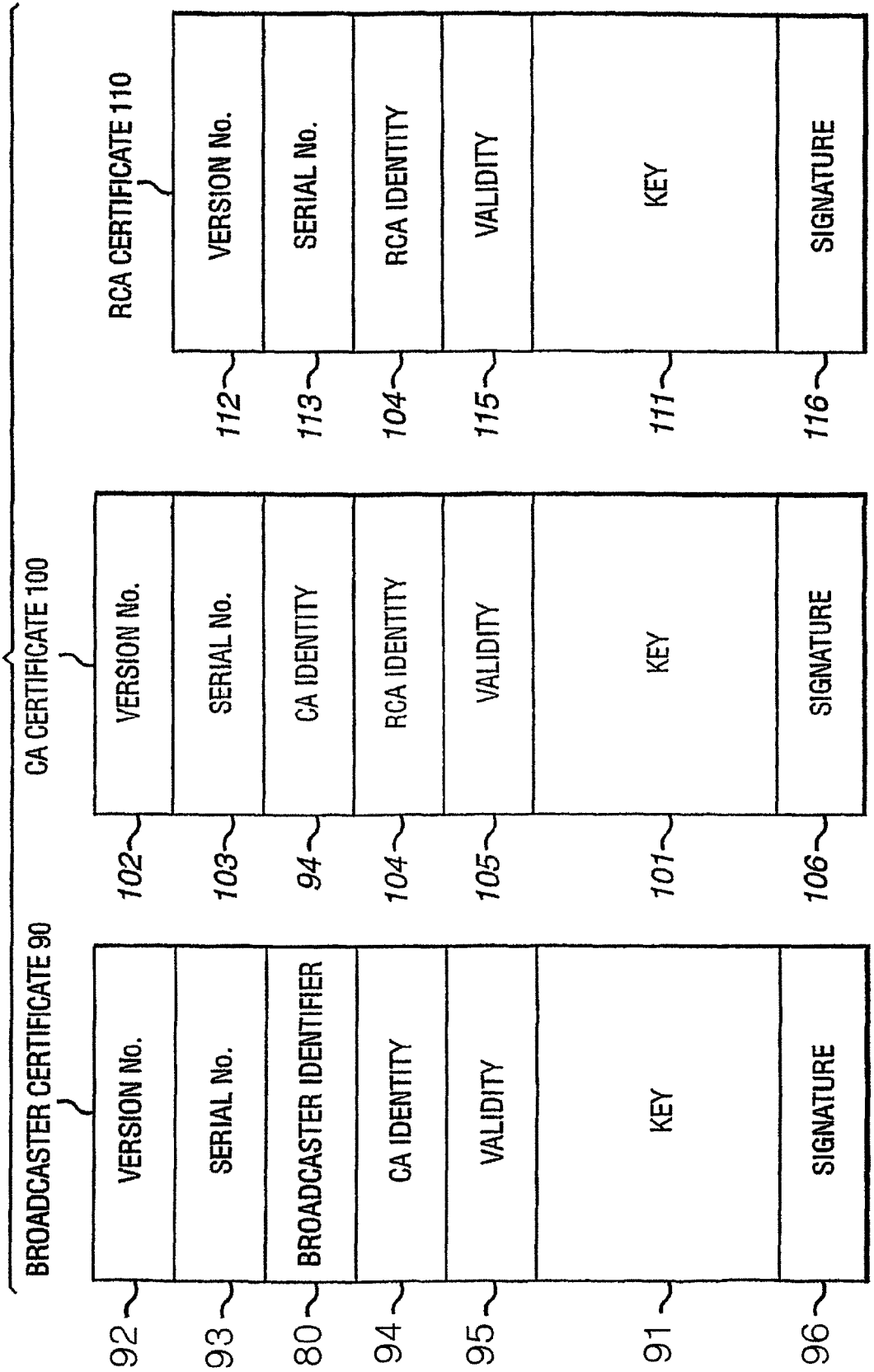
FIG. 8 shows the formats of an broadcaster certificate, a Certification Authority certificate and a Root Certification Authority certificate.

With reference to FIG. 8, the public key 91 and broadcaster identifier 80 are provided to the user of the decoder in a digital certificate, preferably in the form of the well-known International Standards Organisation (ISO) X.509 standard, hard coded into the memory of the decoder during manufacture. Such certificates are distributed to the manufacturers of decoders by trusted third parties, which are usually referred to as Certification Authorities (CAs). The use of such certificates is becoming more widespread primarily due to the Secure Socket Layer (SSL) secure transport protocol developed and standardised by Netscape Communications for securing credit card transactions over the World Wide Web (WWW).

As well as the public key 91 and broadcaster identifier 80, the digital certificate associated with the broadcaster, or broadcaster certificate 90, also includes:

a version number 92 of the broadcaster certificate 90;
a serial number 93 of the broadcaster certificate 90;
a CA identity 94 of the CA which distributed the broadcaster certificate 90;
the validity period 95 of the broadcaster certificate 90 for indicating the start and end of the time period over which the certificate is intended to be used; and
a signature value 96 of the broadcaster certificate 90.

As will be appreciated from the above, the broadcaster certificate includes two different identifiers, a first "issuer name" identifier corresponding to the identity 94 of the distributer of the certificate, and a second "subject name" identifier corresponding to the identifier 80 which identifies the public key 91.

The CA calculates the signature value 96 of the broadcaster certificate 90 by applying a private key of the CA, or CA private key, to at least some or all of the data within the broadcaster certificate. The decoder can then verify this signature value 96 by processing the signature using a corresponding CA public key 101 identified by the CA identity 94 to determine that the contents of the certificate have not been modified subsequent to signature by the CA.

The decoder may store a plurality of such certificates for different respective broadcasters.

Certification Authority Digital Certificates

With further reference to FIG. 8, the corresponding CA public key 101 and CA identifier 94 are provided to the user of the decoder in a CA certificate 100, which is also hard coded in the decoder during manufacture. The CA certificate 100 also includes:

a version number 102 of the CA certificate 100;
a serial number 103 of the CA certificate 100;
a RCA identity 104 of the Root Certificate Authority (RCA), such as the European Telecommunications Standard Institute (ETSI), which distributed the CA certificate 100;
the validity period 105 of the CA certificate 100; and
a signature value 106 of the CA certificate 100.

As will be appreciated from the above, a CA certificate also includes two different identifiers, a first "issuer name" identifier corresponding to the identity 104 of the distributer of the certificate, and a second "subject name" identifier corresponding to the identifier 94 which identifies the public key 101.

The RCA calculates the signature value 106 of the CA certificate 100 by applying a private key of the RCA, or RCA private key, to at least some or all of the data within the CA certificate. The decoder can then verify this signature value 106 by processing the certificate using a corresponding RCA public key 111 identified by the RCA identity 104 to determine that the contents of the certificate have not been modified subsequent to signature by the RCA.

The decoder may store a plurality of such certificates for different respective CAs.

Root Certification Authority Digital Certificates

The corresponding RCA public key 111 and RCA identifier 104 are provided to the user of the decoder in an RCA, or root certificate 110, which is also hard coded in the memory of the decoder during manufacture. Each decoder typically includes a set of two or more root certificates. Each root certificate 110 also includes:

a version number 112 of the root certificate 110;
a serial number 113 of the root certificate 110;
the validity period 114 of the root certificate 110; and
a signature value 115 of the root certificate 110.

As will be appreciated from the above, the root certificate includes only a single identifier, namely the identity 104 of the distributer of the certificate. This identity 104 also identifies the public key 111. Thus, a root certificate may be defined as a certificate in which the issuer name is the same as the subject name.

As the root certificate is the final certificate in the chain of broadcaster certificate 90—CA certificate 100—root certificate 110, the root certificate is self-signed, that is, the signature value is calculated using the equivalent private key to the public key 111. Therefore, it is of concern that the contents of a root certificate does not become publicly available.

It is, of course, possible for the RCA to provide directly the broadcaster certificates 90 to the manufacturer of the decoder, in which case the broadcaster certificate will contain the RCA identifier 111 and be signed using the RCA private key.

Certificate Revocation List

Any of the broadcaster certificates 90, and CA certificates 100 may be revoked, by, for example, deletion, prior to the expiration of the validity period specified therein if, for example, a private key corresponding to the public key stored in the certificate has become compromised. Such revocation can be effected by the transmission to the decoder of a Certificate Revocation List (CRL) containing a list of the serial numbers 92, 102 of the certificates to be revoked. Upon revocation, a certificate is rendered inoperable, preferably by deletion of the certificate from the memory of the decoder, thereby preventing the downloading of any unauthorised, and possible malicious, data packets signed using the compromised private key.

CRLs are distributed by either a CA or an RCA to the broadcaster, which transmits the CRLs to the decoders via either the modem back channel 17 or by broadcasting the CRLs via the MPEG transport stream. It is not essential that the broadcaster inserts the CRLs into all of the transport streams sent from the transmitter to the decoder; it is sufficient for the broadcaster to insert the CRLs into transport streams that are very likely to be tuned to by the decoders. For example, a CRL may be inserted as a data file into a root directory 75 or sub-directory 76 of a set of data files broadcast from the transmitter to the decoder.

With reference to FIG. 9, a CRL 120 typically includes:
  the identity 94 or 104 of the CA or RCA which distributed the CRL 120;
  the date 122 on which the CRL 120 was issued;
  the date 124 on which the next CRL is expected to be issued;
  a list 125 of the serial numbers of the certificates to be revoked, including, for each revoked certificate, the time and date of the revocation of that certificate; and
  a signature value 126 of the CRL, calculated using the private key of the CA or RCA which distributed the CRL 120.

Upon receipt of a CRL, the decoder compares the date 122 on which that CRL 120 was issued with the date 124 on which that CRL 120 was expected, as advised by the previously received CRL. If the date 122 of the newly received CRL is not later than the date 124 on which that CRL was expected, the CRL is ignored.

If the date 122 of the newly received CRL is later than the date 124 on which that CRL was expected, the signature of the CRL is verified using the public key of the issuer of the CA, as identified using the identity 94 or 104 contained in the CRL.

If the integrity of the CRL is so verified, the CRL is processed to add the date 124 to store in permanent memory the date 124 on which the next CRL is expected to be issued, and to store the list 125 of the serial numbers of the revoked certificates. The received list 125 of revoked certificates is also stored in permanent memory of the decoder. For performance reasons, it is preferred that the CRL 120 is cached in the memory of the decoder. It is also preferred that the cache memory of the decoder stores CRLs 120 in an arborescent manner, with the RCA's CRL located at the top of the "tree" and the CRLs of the CAs to which that RCA distributes certificates located at the bottom of the tree.

In the event of the revocation of a broadcaster certificate 90, for example, if the private key of the broadcaster becomes compromised, the Certification Authority for that broadcaster will add the serial number 93 of the broadcaster certificate 90 to its CRL 120. The Certification Authority subsequently distributes the new CRL 120 to all of the broadcasters to which it distributes broadcaster certificates 90 for broadcasting. As soon as a decoder has downloaded the new CRL 120, for example, upon zapping on a broadcaster's channel, the CRL cache is updated and revocation of any certificates so identified in the list 125 of the CRL 120 takes place.

Replacement broadcaster certificates 90 are generated by the Certification Authority 100 and broadcast to the user in a directory 75 or 76 of a file. The replacement broadcaster certificate will include, inter alia, a new public key 91, an updated version number 92, an updated validity period 95, and a new signature value 96 calculated using the private key of the CA. The broadcaster identifier 80 and CA identifier 94 will remain unaltered. Upon receipt of the replacement broadcaster certificate 90, the decoder verifies the certificate by processing the certificate using the corresponding CA public key contained in the CA certificate identified by the CA identity 94.

Upon revocation of a CA certificate 100, the CRL of that CA is removed from the memory of the decoder. Therefore, it may be desirable to revoke voluntarily a CA certificate 100 if, for example, the size of the CRL of that CA becomes too large for storage in the cache memory of the decoder. In this case, the RCA which distributes the CA certificate 100 to that CA will add the serial number 103 of that CA certificate 100 to its CRL. The Root Certification Authority subsequently distributes the new CRL to all of the broadcasters to which the CAs to which that RCA distributes CA certificates in turn distribute broadcaster certificates for broadcasting. As soon as a decoder has downloaded the new CRL, for example, upon zapping on a broadcaster's channel, the CRL cache is updated and revocation of the CA certificates so identified in the list 125 of the CRL 120 takes place.

Upon revocation of a CA certificate 100 of a Certification Authority, in addition to the storage of a new CA certificate for that Certification Authority in the decoder, it is necessary to replace the broadcaster certificates 90 for all of the broadcasters to which that Certification Authority distributes certificates, because, as the private key pair for that Certification Authority is no longer valid, new broadcaster certificates 90, signed using a different or updated private key of the Certification Authority, will be required. A replacement CA certificate 100 is generated by the Root Certification Authority 110 and broadcast to the user in a directory 75 or 76 of a file. Similar to a replacement broadcaster certificate, the replacement CA certificate will include, inter alia, a new CA public key 101, an updated version number 102, an updated validity period 105, and a new signature value 106 calculated using the private key of the RCA. The CA identifier 94 and RCA identifier 104 will remain unaltered. Upon receipt of the replacement CA certificate 100, the decoder verifies the certificate by processing the certificate using the corresponding RCA public key contained in the RCA certificate 110 identified by the RCA identity 104.

Root Certificate Management Message

Upon revocation of a RCA certificate 110 of a Root Certification Authority, it is necessary to replace the revoked RCA certificate with a new RCA. As described above, RCA certificates are self-signed, and therefore inclusion of an RCA certificate in a CRL is not desirable as it is possible for a hacker to come into possession of the certificate if he is aware of the private key used to sign the CRL. Therefore, it has been hitherto necessary to return the decoder to the manufacturer each time an RCA certificate is to be updated, for example, when it has become out-dated or revoked.

To overcome this problem, a Root Certificate Management Message (RCMM) is generated by the Root Certification Authority for broadcast by the broadcasters to decoders. As explained in more detail below, a RCMM contains, similar to a CRL, a list 125 of the serial numbers of root certificates to be revoked, including, for each revoked root certificate, the time and date for the revocation of that certificate, together with one or more replacement root certificates for those certificates which have become out-dated or are identified in the list 125.

As will be appreciated, in view of the sensitive contents (new root certificates) of the RCMM, it is important to ensure that an RCMM is received by the decoder "as issued" to the broadcaster, that is, to ensure that the contents of the RCMM have not changed between distribution and reception. It is also important to ensure that the RCMM can only be accessed by the decoders to whom the RCMM is addressed.

To enhance security, an RCMM, unlike a CRL, contains at least two signature values for at least some, preferably all, of the data included therein. Each signature value is calculated using a key of a respective encryption algorithm, such as a private key of public/private key pair.

When an RCMM is issued by a Root Certification Authority (RCA), and includes a new root certificate 110, the RCMM includes at least two signature values. Each signature value is calculated using a respective private key of, for example, a Certification Authority to which that RCA supplies certificates (although any key for which the decoder stores an equivalent key may be chosen). If, unbeknown to one of those Certification Authorities, its private key has become compromised, it may be possible for a "hacker" to intercept the broadcast of the broadcaster and, if he knows the private keys of both the broadcaster and the Certification Authority, change the contents of the RCMM and the signature value of the RCMM calculated using the private key of the Certification Authority. However, it will not be possible for the hacker to change the signature value calculated using the private key of the other Certification Authority, because this key has not become compromised. Therefore, upon verification of the signatures by the decoder using the public keys of the two Certification Authorities, the two values calculated by the decoder using the respective public keys will not be the same. Therefore, the decoder will be alerted to the lack of integrity of the contents of the RCMM and will reject, or otherwise not proceed with the processing of, the RCMM.

Consequently, root certificates can be updated securely, provided that the number of compromised certificates is lower than the number of signatures contained in the RCMM. Therefore, the number of signatures of the RCMM is a variable determined by the Root Certification Authority distributing RCMMs.

Figure 10:
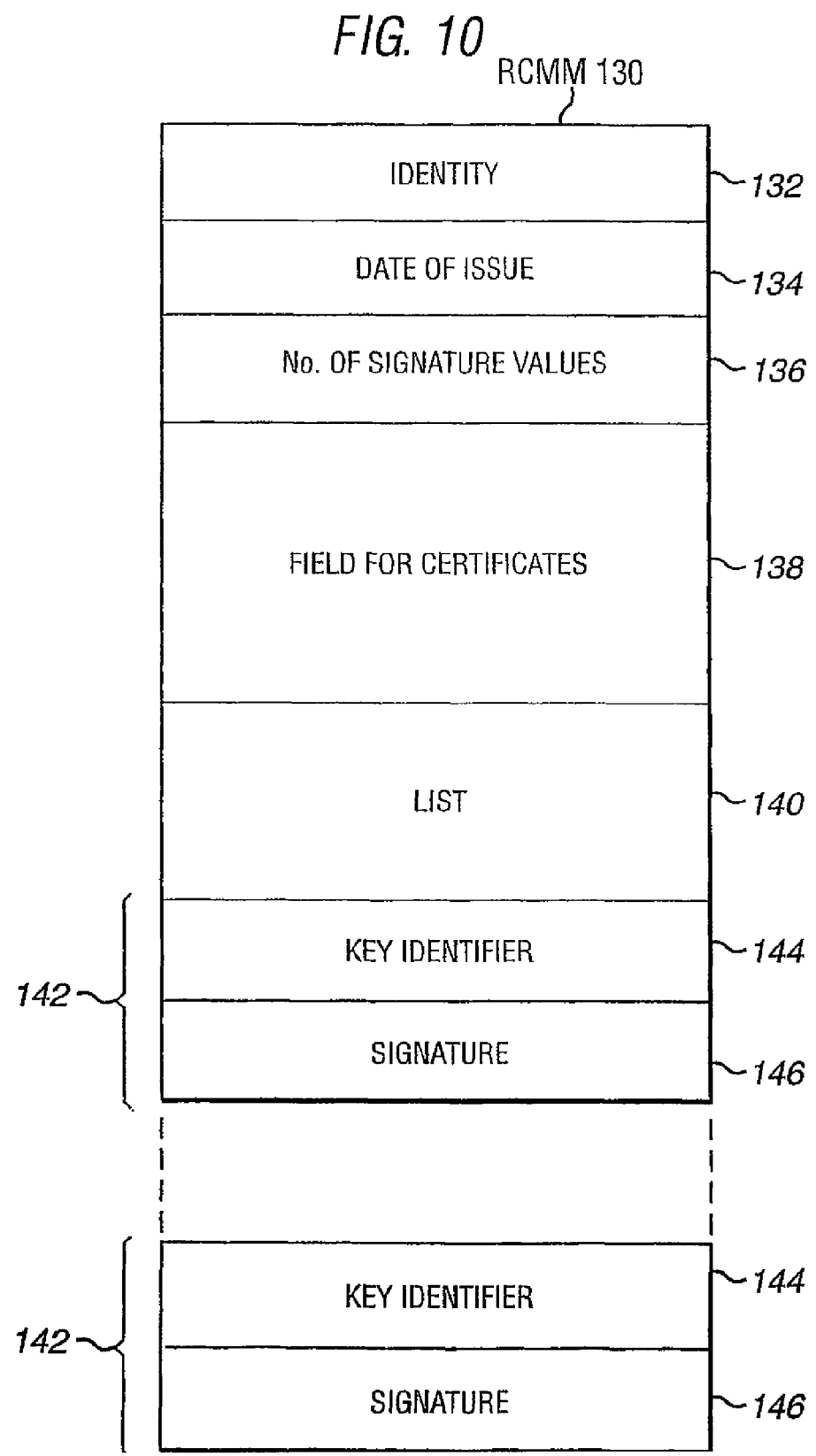
FIG. 10 shows the format of a Root Certificate Management Message (RCMM)

The format of an RCMM will now be described in more detail with reference to FIG. 10.

The RCMM 130 includes:
the identity 132 of the RCA which distributed the RCMM 130;
the date 134 on which the RCMM 130 was issued;
the number 136 of signature values which the subsequent RCMM will contain;
a field 138 containing one or more updated or replacement root certificates to be stored in the decoder;
a list 140 of the serial numbers of the root certificates to be revoked, including, for each revoked root certificate, the time and date of the revocation of that certificate; and
at least two signature fields 142 each containing
an identifier 144 of the certificate stored in the decoder which contains the public key to be used to verify the signature value contained in that signature field; and
a signature value 146 of the RCMM, calculated using the equivalent private key to the public key contained in the certificate identified by the identifier 144.

The number of signature fields 142 should be equal to or greater than the number 136 of signature fields as advised in the previously received RCMM.

It is preferred that RCMMs are transmitted via the MPEG transport stream, as the modem back channel may be easily disconnected, or may simply not be present. It is also preferred that RCMMs are inserted by the broadcaster as a data file into a root directory 75, in order to ensure that the RCMM is downloaded by the decoder.

Processing and Generation of Root Certificate Management Messages

Figure 11:
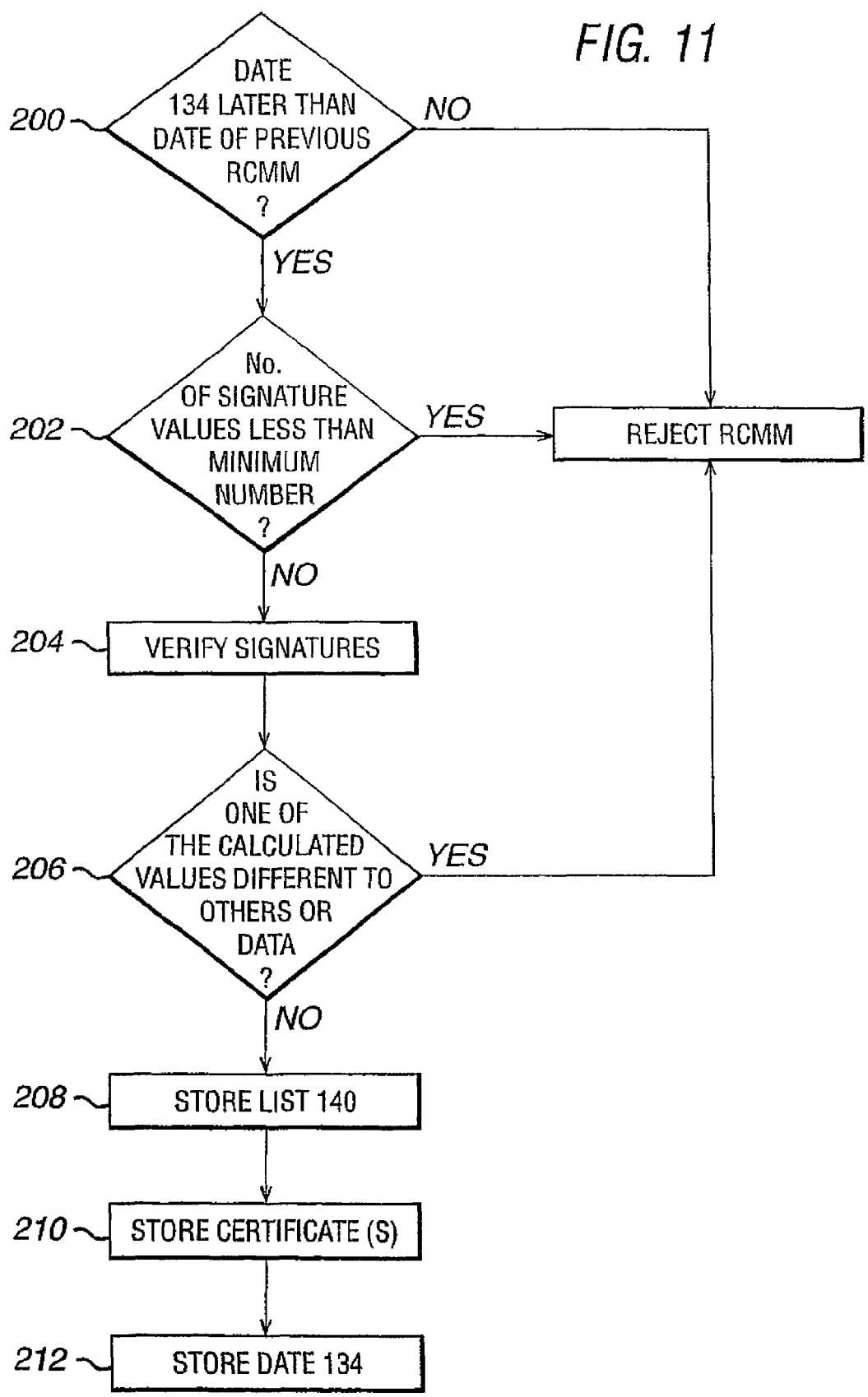
FIG. 11 shows the steps involved in the processing of an RCMM upon receipt by a decoder.

Receipt and processing of an RCMM by a decoder will now be described with reference to FIG. 11.

Upon receipt of an RCMM, in step 200 the decoder compares the date 134 on which that RCMM 130 was issued on which the previously issued RCMM. If the date 134 of the newly received RCMM is not later than the date on which the previous RCMM was issued, the RCMM is rejected.

If the date 134 of the newly received RCMM is later than the date of receipt of the previous RCMM, the number 136 of signatures values which the newly received RCMM is to contain, as advised by the previously received RCMM, is compared in step 202 with the number of signature values which are actually contained in the newly received RCMM. If the number of signatures contained in the newly received RCMM is lower than expected, the RCMM is rejected. This can prevent an RCMM from being otherwise processed as a result of a hacker removing signatures associated with uncompromised private/public key pairs.

If the number of signatures contained in the newly received RCMM is equal to, or greater than, the expected number of signatures, in step 204 each signature value 146 contained in the RCMM is verified using the public key identified by the identifier 144 contained in the same signature field 142 as that signature value. In step 206, the decoder determines whether at least one of the values calculated using a public keys is different to any of the other values calculated using a different public key. If at least one calculated value is different from at least one of the other calculated values, the RCMM is rejected.

If the integrity of the RCMM is proven in step 206, the RCMM is processed in step 208 to store the list 140 of the serial numbers of the revoked root certificates in permanent memory of the decoder so that those certificates may be deleted from the memory of the decoder, in step 212 to store the or each root certificate contained in field 138 in permanent memory of the decoder, and in step 212 to store in permanent memory the date 134 of the RCMM. If a certificate of a Root Certification Authority is deleted, any CRLs issued by that Authority are also deleted.

It is preferred that the integrity of the permanent storage of the data contained in the RCMM is maintained if the decoder is switched off during processing of the RCMM message. Therefore, if the power is indeed switched off during RCMM processing, the list 140 associated with the previously processed RCMM which is stored in the decoder is retained as if the newly received RCMM message had not been processed at all.

As mentioned earlier, a Root Certification Authority (RCA) typically has at least two RCA certificates, RC0 and RC1, stored in each decoder. In the event that one of these certificates, say RC0, becomes compromised, it will be necessary to replace all the CA certificates stored in the decoder which have been signed using the equivalent private key to the public key stored in RC0, and generate a new RCA certificate RC2 to replace RC0.

With reference to FIG. 12, to replace these CA certificates, firstly in step 300 an appropriate CRL message identifying the serial numbers of the CA certificates to be revoked is issued by the RCA. Secondly, in step 302 replacement CA certificates, signed using the private key of the uncompromised certificate RC1, are issued to the broadcaster for broadcast to the decoder.

It then remains to delete the compromised RCA certificate RC0 and replace this certificate with a new RCA certificate RC2. In step 304 the RCA generates a new public/private key pair, inserts the new public key in the certificate RC2 and signs the certificate using the new private key.

In step 306, the RCA generates an RCMM containing, in field 138, certificate RC2 and, in list 140, the serial number of RC0. The RCMM is distributed to the broadcasters for transmittal, in step 308, to the decoders to delete the compromised certificate RC0 and replace this with the new certificate RC2.

The RCA certificates RC1 and RC2 will subsequently be provided to the decoder manufacturer for hard-coding into the memory of new decoders.

It will be understood that the present invention has been described above purely by way of example, and modifications of detail can be made within the scope of the invention.

For example, the RCMM may include, in addition to new RCA certificates 110, new CA certificates 100 and/or new broadcaster certificates 90, and the list 140 may include identifiers of CA certificates and/or broadcaster certificates which are to be revoked. This can enable the generation of separate CRL messages by an RCA to be obviated.

Each feature disclosed in the description, and (where appropriate) the claims and drawings may be provided independently or in any appropriate combination.

The invention claimed is:

1. A method of authenticating data to be transmitted by a transmitter in a digital transmission system, comprising:
   when the data comprises at least one identifier of a certificate to be revoked:
      calculating at least one digital signature from the data, wherein the at least one digital signature is calculated using a key associated with at least a first encryption algorithm; and
      outputting, by the transmitter, the data and the at least one digital signature,
   when the data comprises at least one replacement root certificate:
      calculating at least two digital signatures from the data, wherein the at least two digital signatures are calculated from the same data, and wherein each digital signature is calculated using a key corresponding to at least a second and a third encryption algorithm, respectively; and
      outputting, by the transmitter, the data and the at least two digital signatures,
   wherein the data and the at least two digital signatures are organized in a data file,
   wherein the data file is output in a data module, and
   wherein a module encrypted value for the data in the data module is calculated using a key corresponding to a transmitter encryption algorithm and output in the data module.

2. An apparatus configured to authenticate data to be transmitted by a transmitter in a digital transmission system, comprising:
   when the data comprises at least one identifier of a certificate to be revoked:
      means for calculating at least one digital signature from the data, wherein the at least one digital signature is calculated using a key associated with at least a first encryption algorithm; and
      the transmitter for outputting the data and the at least one digital signature,
   when the data comprises at least one replacement root certificate:
      means for calculating at least two digital signatures from the data, wherein the at least two encrypted values digital signatures are calculated from the same data, and wherein each digital signature is calculated using a key corresponding to at least a second and a third encryption algorithm, respectively; and
      the transmitter for outputting the data and the at least two digital signatures,
   wherein the data and the at least two digital signatures are organized in a data file,
   wherein the data file is output in a data module, and
   wherein a module encrypted value for the data in the data module is calculated using a key corresponding to a transmitter encryption algorithm and output in the data module.

* * * * *